(12) United States Patent
Fadell

(10) Patent No.: US 12,085,465 B2
(45) Date of Patent: Sep. 10, 2024

(54) DIAPHRAGM SEAL WITH INTEGRAL FLUSHING RING

(71) Applicant: Rosemount Inc., Shakopee, MN (US)

(72) Inventor: Paul R. Fadell, Cypress, TX (US)

(73) Assignee: Rosemount Inc., Shakopee, MN (US)

( * ) Notice: Subject to any disclaimer, the term of this patent is extended or adjusted under 35 U.S.C. 154(b) by 133 days.

(21) Appl. No.: 16/139,771

(22) Filed: Sep. 24, 2018

(65) Prior Publication Data

US 2019/0101467 A1    Apr. 4, 2019

Related U.S. Application Data

(60) Provisional application No. 62/568,078, filed on Oct. 4, 2017.

(51) Int. Cl.
| | |
|---|---|
| *G01L 19/06* | (2006.01) |
| *B08B 3/02* | (2006.01) |
| *B08B 3/04* | (2006.01) |
| *F16J 15/52* | (2006.01) |

(52) U.S. Cl.
CPC ............ *G01L 19/0645* (2013.01); *B08B 3/02* (2013.01); *B08B 3/04* (2013.01); *F16J 15/52* (2013.01)

(58) Field of Classification Search
CPC .................................................. G01L 19/0645
USPC .......................................................... 73/715
See application file for complete search history.

(56) References Cited

U.S. PATENT DOCUMENTS

| | | | | |
|---|---|---|---|---|
| 2,841,984 | A * | 7/1958 | Green .................. | G01L 19/0645 73/706 |
| 4,192,192 | A * | 3/1980 | Schnell ............... | G01L 19/0007 73/706 |
| 4,199,991 | A * | 4/1980 | Kodama ............. | G01L 19/0046 228/135 |
| 5,070,903 | A * | 12/1991 | Steudler, Jr. ....... | G05D 16/0683 137/505.46 |
| 6,263,739 | B1 | 7/2001 | Seefried et al. | |
| 7,674,254 | B2 | 3/2010 | Baumfalk et al. | |

(Continued)

FOREIGN PATENT DOCUMENTS

| | | |
|---|---|---|
| CN | 202631182 U | 12/2012 |
| EP | 1640647 A2 | 3/2006 |

(Continued)

OTHER PUBLICATIONS

Yang. Translation of CN202631182. Published Dec. 2012. Translated Jun. 2020. (Year: 2012).*

(Continued)

*Primary Examiner* — Walter L Lindsay, Jr.
*Assistant Examiner* — Philip T Fadul
(74) *Attorney, Agent, or Firm* — Christopher R. Christenson; Kelly, Holt & Christenson, P.L.L.C.

(57) ABSTRACT

A remote diaphragm seal is provided. The remote diaphragm seal includes a flange coupled to a deflectable diaphragm configured to come into contact with a flow of process fluid along a first side of the diaphragm. The flange includes a fluidic passageway in fluidic communication with a second side of the deflectable diaphragm, the fluidic passageway including a substantially incompressible fluid. The flange also includes at least one additional passageway in fluidic communication with the first side of the deflectable diaphragm.

7 Claims, 6 Drawing Sheets

(56) References Cited

U.S. PATENT DOCUMENTS

| | | | |
|---|---|---|---|
| 7,954,994 B2 * | 6/2011 | Warth | G01L 19/0092 374/143 |
| 8,640,560 B2 | 2/2014 | Bruke | |
| 2004/0027912 A1 | 2/2004 | Bibbo et al. | |
| 2012/0240686 A1 | 9/2012 | Blomberg et al. | |
| 2016/0349128 A1 * | 12/2016 | Kaufmann | G01L 7/084 |

FOREIGN PATENT DOCUMENTS

| | | |
|---|---|---|
| JP | H0572016 A | 3/1993 |
| JP | H06331418 A | 12/1994 |
| JP | 2004069579 A | 3/2004 |

OTHER PUBLICATIONS

Nishi. Machine translation of JP2004069579: "Differential Pressure/Pressure Transmitter." Published Mar. 2004. Accessed Nov. 2021. (Year: 2004).*

International Search Report and Written Opinion dated Jan. 9, 2019, for International Patent Application No. PCT/US2018/053028, pp. 16.

First Office Action for Japanese Patent Application No. 2020-517100, dated Mar. 9, 2021, 10 pages including English translation.

Rejection Decision for Japanese Patent Application No. 2020-517100, dated Jun. 22, 2021, 10 pages including English translation.

Extended Search Report for European Patent Application No. 18863917.3, dated Jun. 29, 2021, 9 pages.

First Office Action for Chinese Patent Application No. 201880064642.4, dated Jul. 5, 2021, 17 pages including English translation.

Second Office Action dated Feb. 15, 2022 for Chinese Patent Application No. 201880064642.4, 7 pages including English translation.

Third Office Action for Chinese Application No. 201880064642.4, dated Jun. 21, 2022, 14 pages including English translation.

Rejection Decision for Chinese Patent Application No. 201880064642.4, Dated Nov. 2, 2022, 13 pages.

Office Action for European Application No. 18863917.3, dated Mar. 28, 2023, 6 pages.

Office Action for European Patent Application No. 18863917.3, Dated Mar. 12, 2024, 4 pages.

* cited by examiner

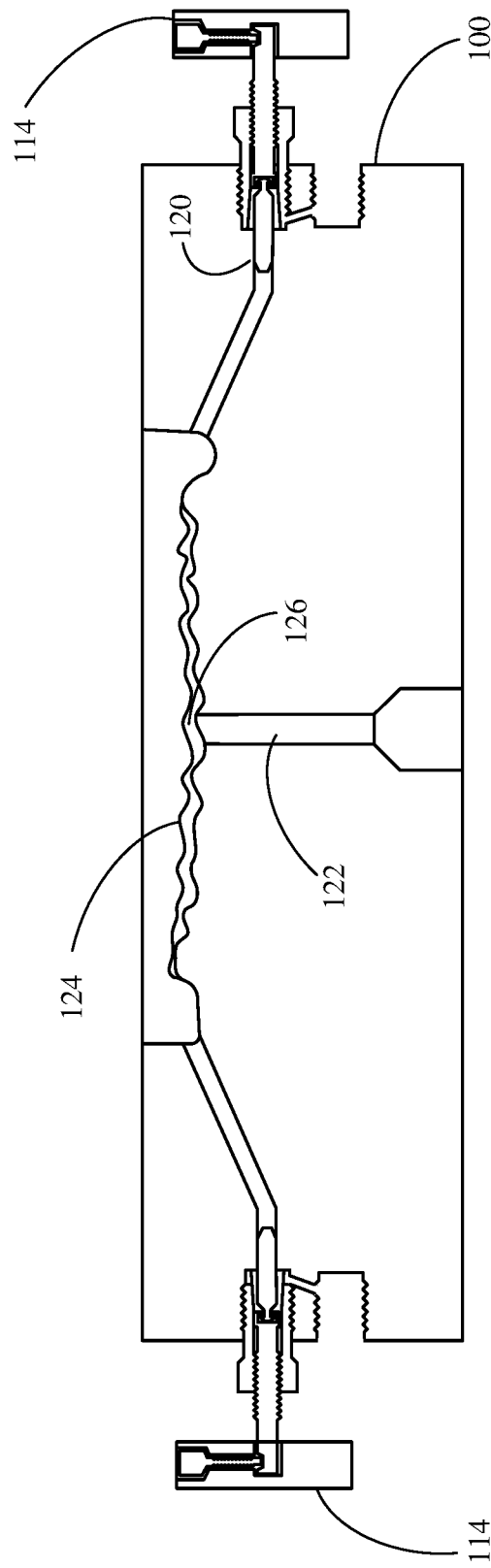

DIAPHRAGM SEAL WITH INTEGRAL FLUSHING RING

CROSS-REFERENCE TO RELATED APPLICATIONS

The present application is based on and claims the benefit of U.S. Provisional Patent Application Serial No. 62/568,078 filed Oct. 4, 2017, the content of which is hereby incorporated by reference in its entirety.

BACKGROUND

Industrial process control systems are used to monitor and control industrial processes used to produce or transfer fluids or the like. In such systems, it is typically important to measure "process variables" such as temperatures, pressures, flow rates, and others. Process control transmitters are used to measure such process variables and transmit information related to the measured process variable back to a central location such as a central control room.

One type of process variable transmitter is a pressure transmitter which measures process fluid pressure and provides an output related to the measured pressure. This output may be a pressure, a flow rate, a level of a process fluid, or other process variable that can be derived from the measured pressure. The pressure transmitter is configured to transmit information related to the measured pressure back to a central control room. The transmission is typically over a two wire process control loop, however, other communication techniques are sometimes used, including wireless techniques.

The pressure must be coupled to a process variable transmitter through some type of process coupling. In certain process pressure measurement applications, the pressure transmitter is located remotely relative to a pressurized process fluid, and pressure is physically conveyed from the process fluid to the pressure transmitter through a fluid link using a device called a remote seal. A remote seal is a secondary system that is filled with a substantially incompressible fluid that transmits pressure from the process fluid to the pressure transmitter. Remote seals are typically used in applications where the process fluid has a high temperature, is corrosive, or has some other extreme application or characteristic that could damage or disrupt the pressure transmitter if the pressure transmitter were located too close to the process fluid.

SUMMARY

A remote diaphragm seal is provided. The remote diaphragm seal includes a flange coupled to a deflectable diaphragm configured to come into contact with a flow of process fluid along a first side of the diaphragm. The flange includes a fluidic passageway in fluidic communication with a second side of the deflectable diaphragm, the fluidic passageway including a substantially incompressible fluid. The flange also includes at least one additional passageway in fluidic communication with the first side of the deflectable diaphragm.

BRIEF DESCRIPTION OF THE DRAWINGS

FIG. 1B is a diagrammatic cross-sectional view of the remote seal shown in FIG. 1A.

DETAILED DESCRIPTION OF ILLUSTRATIVE EMBODIMENTS

Existing installations of process fluid pressure transmitters with remote diaphragm seals often require a flushing ring with ports for valves threaded or welded in to control the flow of liquid to flush the face of the diaphragm to remove process buildup.

Process fluid pressure transmitters with flanged diaphragm remote seals are often specified with "drip rings" or lower housings with multiple flushing ports. These require an additional gasket connection and are intended for use with threaded in or welded instrument needle or other valves to allow access to the diaphragm seal to clean or calibrate the remote seal without removal of the diaphragm seal. The number of additional connections, weight, and expense of such systems is quite high, especially when corrosion-resistant alloys are required. In addition, it may be desirable for other types of measurements to be made to the process. Often, additional flanged connections are required for temperature, pH, or other such measurements.

Embodiments described herein generally provide a highly integrated diaphragm seal system that includes valved ports with specialized distributed diaphragm cleaning channels or passages. Additionally, one or more integral, internal features of the diaphragm seal system provide the ability to obtain one or more additional process measurements, such as temperature or pH. The described system eliminates the need for additional gaskets, pipe nipples, valves connections, valve bodies, bonnets, and their respective potential leak points. The described system may also provide an integrated welded thermowell or other port for a threaded or welded pH probe or other measurement instrumentation.

Figure 1A:
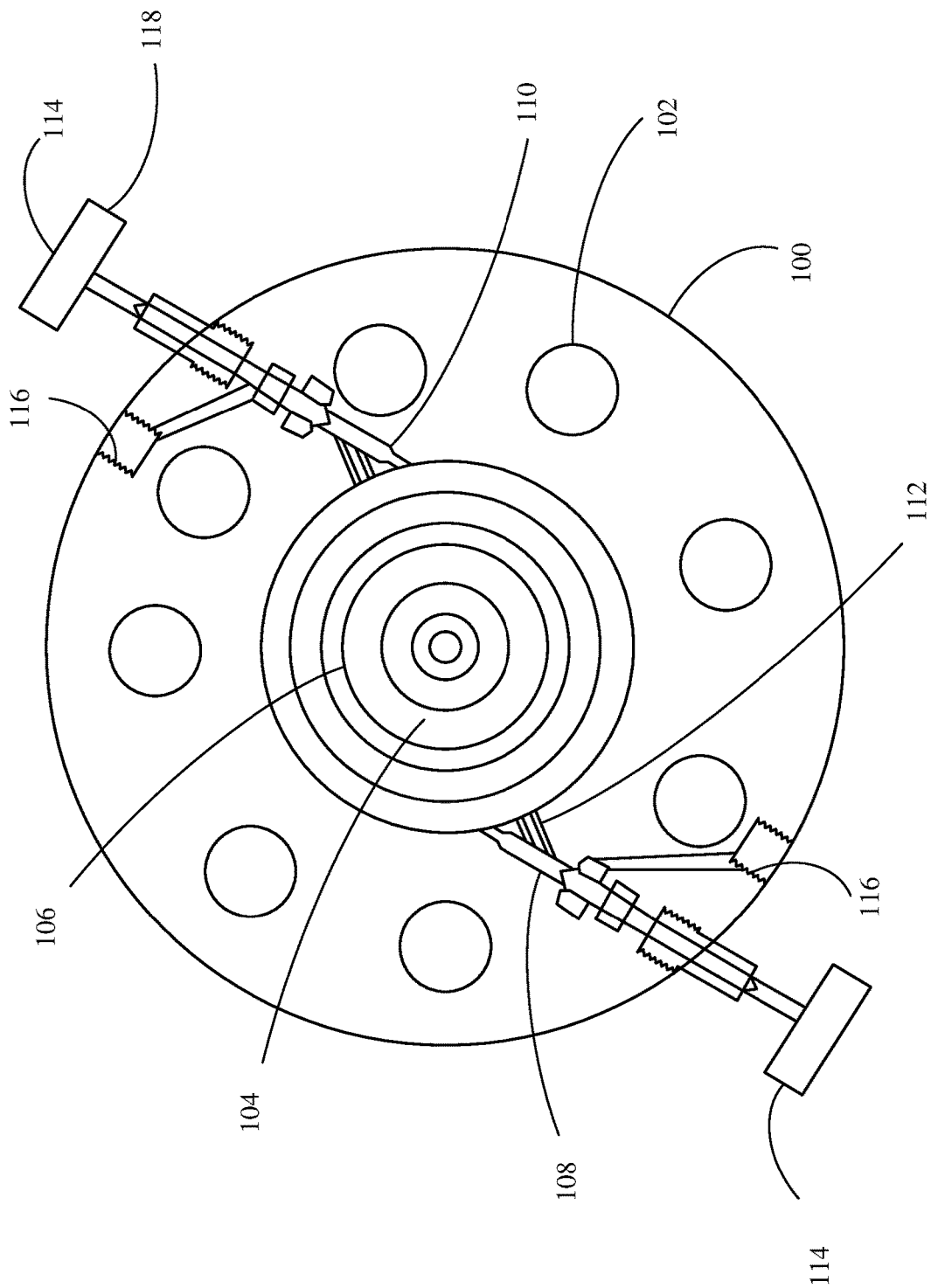
FIG. 1A is a diagrammatic bottom plan view of a remote seal in accordance with an embodiment of the present invention.

FIG. 1A and 1B are diagrammatic bottom plan and diagrammatic cross-sectional views. respectively, of a remote seal in accordance with an embodiment of the present invention. FIG. 1A illustrates diaphragm seal system 100 having a generally circular shape, and including a number of bolt holes 102 to facilitate mounting to an associated pipe flange, or other suitable flange. A deflectable diaphragm 104 is sealingly welded about its periphery to flange 100. Diaphragm 104 is shown with a number of corrugations 106, but can take any suitable form. In accordance with one embodiment, flange 100 includes at least one integral flushing channel 108. In the embodiment illustrated in FIG. 1A, flange 100 includes a pair of diaphragm flushing channels 108, 110. Additionally, each of channels 108, 110, can break into a number of sub channels 112 in order to distribute fluid flow and improve the efficiency of the flushing operation. Each of flushing channels 108, 110, is coupled to a valve 114 that selectably allows fluidic communication between the respective flushing channels 108, 110, and vent or flushing connections 116. In one embodiment, these vent or flushing connections are valved, or otherwise coupled to a fluid handling component in order to route and dispose of fluid during the flushing operation.

In one embodiment, each of vent or flushing connections 116 is internally threaded in order to receive a suitable fluid handling component such as a valve or hose. As shown in FIG. 1A each of valves 114 preferably does not include a bonnet but instead only includes a packing and packing nut such that the valve stem is driven axially by rotation of handle 118 that engages a seat 120 in the flange. This seat 120 can be seen in greater detail FIG. 1B, which shows flange 100 including a fluid passageway 122 that fluidically couples fluid proximate diaphragm 124 (in region 126) to a suitable pressure measurement instrument, such as a process fluid pressure transmitter.

Figure 2:
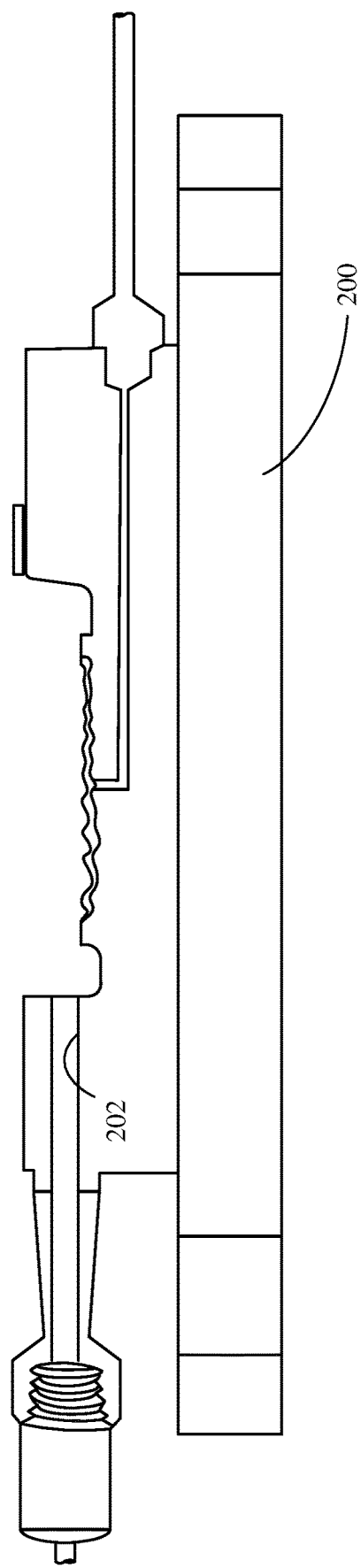
FIG. 2 is a diagrammatic cross-sectional view of a remote seal having in integral thermowell in accordance with an embodiment of the present invention.

FIG. 2 is a diagrammatic cross-sectional view of a remote seal having in integral thermowell in accordance with an embodiment of the present invention. FIG. 2 illustrates flange 200 having an integral, internal process variable measurement port 202. In the example shown in FIG. 2, port 202 is configured to receive a threaded temperature measurement probe. However, other types of measurement probes can be used in accordance with embodiments of the present invention. For example, an additional process variable measurement, such as temperature, or pH, can be obtained by inserting a measurement probe in port 202. In embodiments where neither flushing nor and additional sensor are required, port 202 can simply be plugged. By providing an integrated process variable measurement port 202, no additional gasket or sealing materials are required when a threaded measurement probe is coupled to port 202. This reduces the likelihood of generating a leak at the location of the process variable measurement port. While the embodiment shown in FIGS. 1A and 1B includes integrated flushing ports, and the embodiment shown in FIG. 2 provides integrated process variable measurement ports, it is expressly contemplated that embodiments of the present inventions can be practiced where both such types of ports are included on a single flange.

Figure 3:
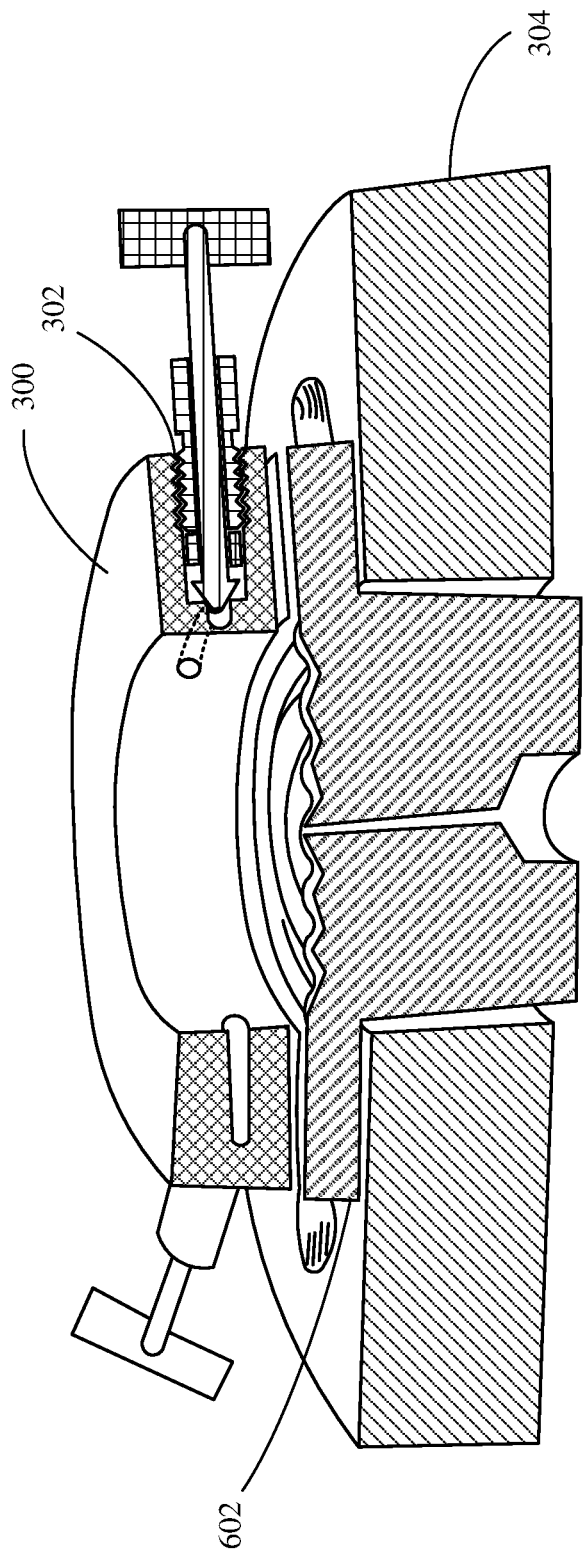
FIG. 3 is a diagrammatic view of a flushing ring in accordance with an embodiment of the present invention disposed adjacent a standard diaphragm seal.

FIG. 3 is a cross-sectional view of an integrated diaphragm seal system in accordance with embodiment of the present invention. While embodiments described thus far generally provide one or more integral features with a flange connection, it is expressly contemplated that embodiments of the present invention include providing one or more integral features with a flushing ring. In such embodiments, flushing ring designs are provided for multiple diaphragm seal types that contain valve seats and internal channels to allow a relatively large bore needle valve bonnets to be integrally installed with no additional welding or threaded connection points. In the example shown, flushing ring 300 is mounted proximate a standard diaphragm seal 602. Accordingly, embodiments described herein can be practiced with remote seals, standard diaphragm seals or any other suitable structure that may benefit from selective flushing or calibration in a sealed system.

The embodiments described with respect to FIGS. 1-3 provide a number of features and advantages. For example, a diaphragm remote seal and flange (or other connection hardware) is provided with integral valved connection ports thereby reducing overall weight, leak points, and system cost. Additionally, embodiments may include a process variable measurement port, such as a thermowell connection, that is integral with the flange to allow for connecting an additional sensor to the process without generating an additional process intrusion, and associated potential leak point. Additionally, some embodiments may include a recessed connection for cooling process fluid to a temperature suitable to make additional measurements with lower temperature capable instrumentation. Additionally, late customization of diaphragm material maybe facilitated by separating the diaphragm seal from the flange or connection hardware. Finally, embodiments described thus far may include the ability to coat wetted surfaces with exotic material alloys to further reduce cost.

Figure 4:
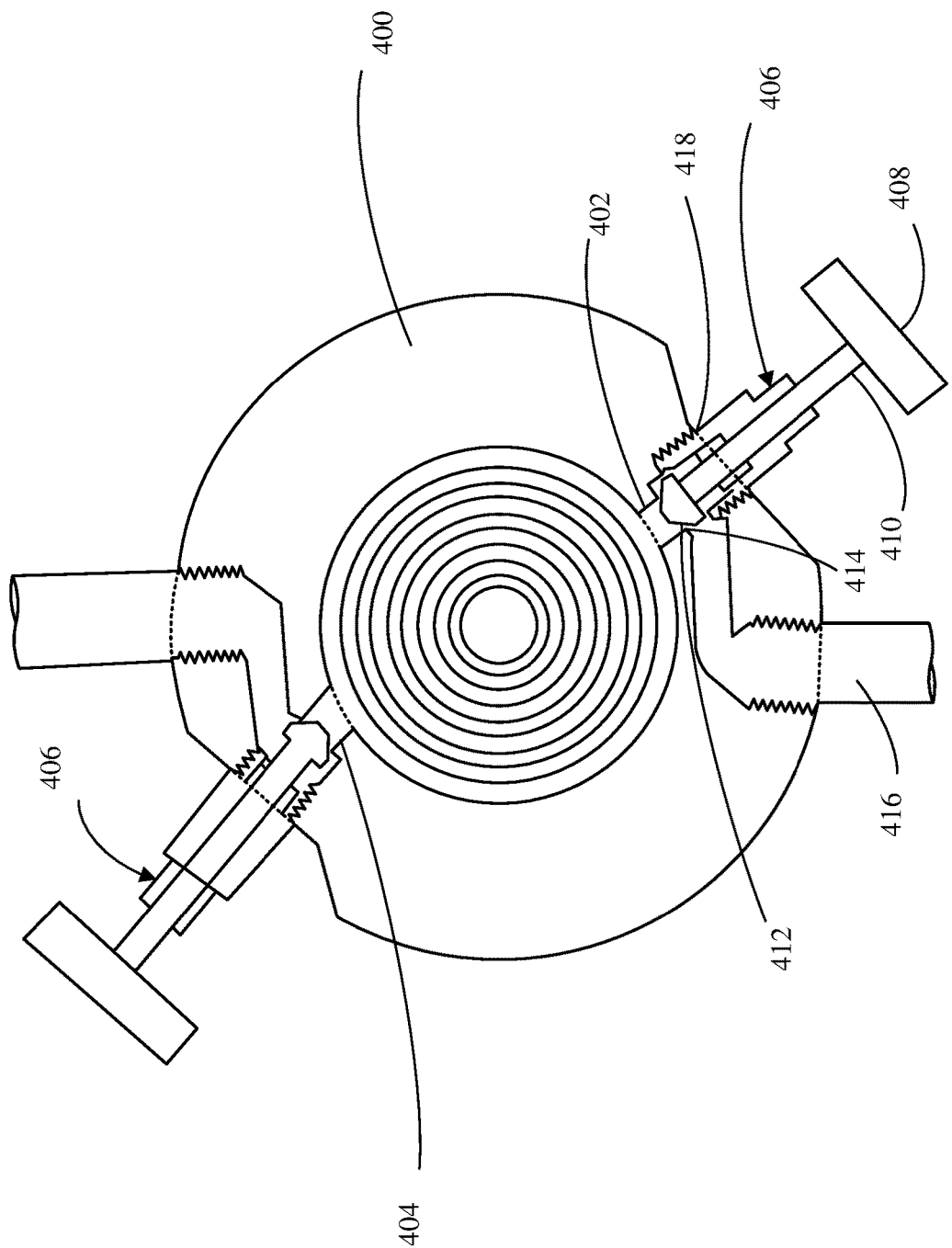
FIG. 4 is a diagrammatic bottom plan view of a flushing ring with integral valves in accordance with an embodiment to the present invention.

FIG. 4 is a diagrammatic bottom plan view of a flushing ring with integral valves in accordance with an embodiment to the present invention. The view shown in FIG. 4 is directed toward the diaphragm seal. Flushing ring 400 included a plurality of flushing channels 402, 404 each of which is valved by valves 406. As shown, each valve 406 includes a handle 408 that upon rotation moves stem 410 axially to drive end 412 into or out of engagement with seat 414 to control fluidic communication between chamber 402, and controlled inlet/outlet 416. As shown, valves 406 each preferably include a bonnet seal 418 to the body of flushing ring 400. In this way, a highly integrated and low-cost fluid management system is provided in flushing ring 400 with reduced cost, weight, and complexity.

Figure 5:
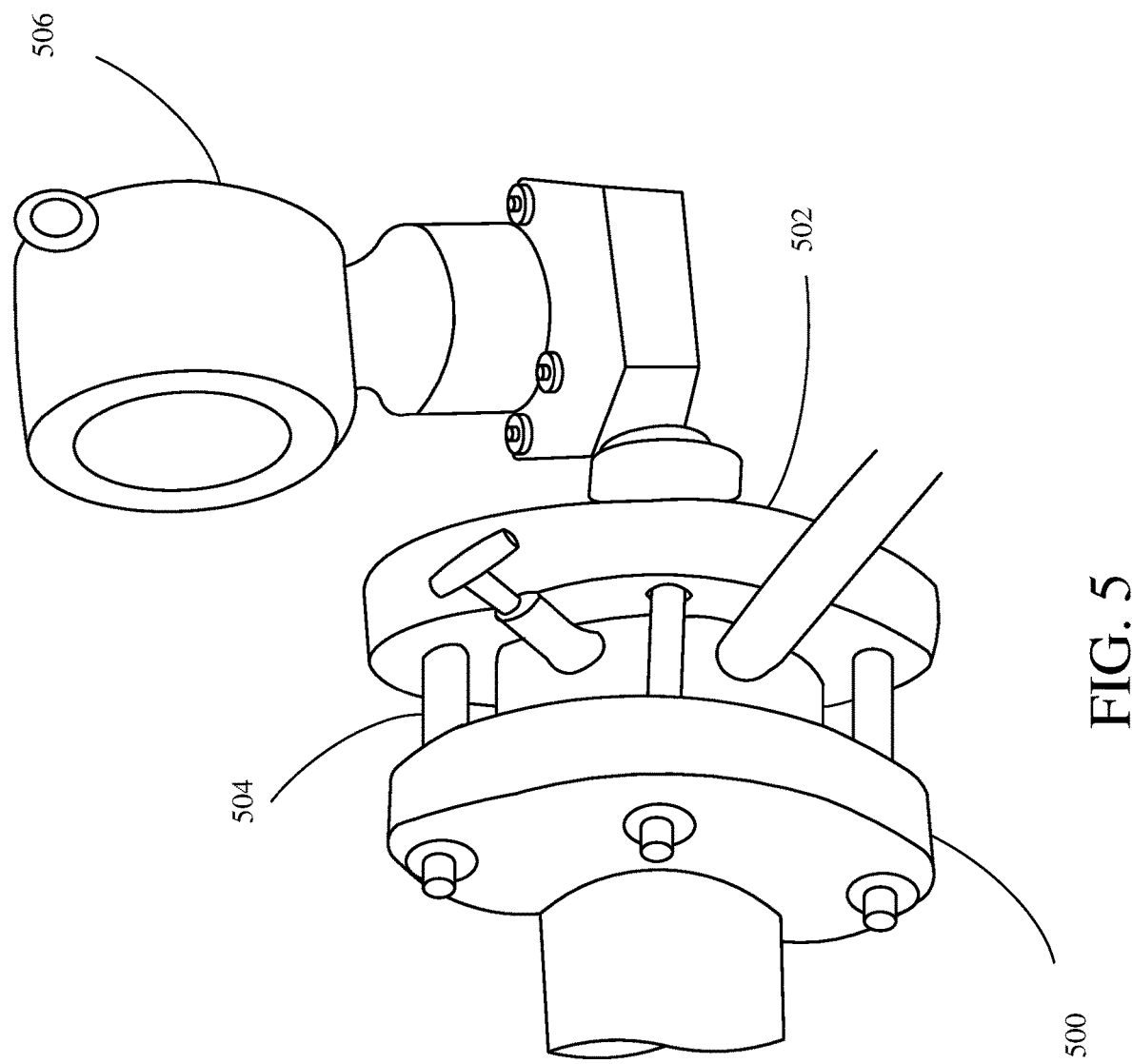
FIG. 5 is a diagrammatic perspective view of a flushing ring disposed between a pair of flanges and coupled to process pressure transmitter in accordance with embodiment to the present invention.

FIG. 5 is a diagrammatic perspective view of a flushing ring disposed between a pair of flanges and coupled to process pressure transmitter in accordance with embodiment to the present invention. Flange 500 is coupled to remote seal measurement flange 502 via a number of bolt connections 504. A flushing ring with internal valves is disposed between flanges 500 and 502 in order to provide the flushing function to clear or otherwise clean material on the diaphragm. Flange 502 is operably coupled to process fluid pressure transmitter 506 which receives an indication of process fluid pressure acting against flange 502 and provides a measurement of such process fluid pressure.

Providing a flushing/calibration ring for use with diaphragm seals that integrates internal channels, valve seats, and valve bonnet threads to eliminate the need for separate valves is highly advantageous. Valve bonnets that seal on the outer surface of the flushing ring may be provided in order to maximize the internal channel diameter. Moreover, the valves may be provided at an angle in order to allow for positive drainage.

Although the present invention has been described with reference to preferred embodiments, workers skilled in the art will recognize that changes may be made in form and detail without departing from the spirit and scope of the invention.

What is claimed is:

1. A remote diaphragm seal with an integral flushing connection, the remote diaphragm seal comprising:
   a flange configured to mount to a process to receive a process fluid, the flange having a circular deflectable diaphragm sealingly welded to the flange, the circular deflectable diaphragm being configured to contact the process fluid along a first side of the circular deflectable diaphragm, the flange including:
      a process fluid passageway in fluidic communication with the first side of the circular deflectable diaphragm and configured to receive the process fluid;
      a fluidic passageway in fluidic communication with a second side of the circular deflectable diaphragm;
      at least one additional passageway in fluidic communication with the first side of the circular deflectable diaphragm, the at least one additional passageway being coupled to a flushing connection configured to receive a flow of cleaning fluid; and an internal valve assembly configured to selectively allow the flow of cleaning fluid to flow from the flushing connection, through the at least one additional passageway, to the first side of the circular deflectable diaphragm; and at least one measurement passageway configured to receive, and couple to, a measurement probe to measure a variable of the process fluid. wherein the measurement probe is a threaded temperature measurement probe configured to determine a temperature of the process fluid.

2. The remote diaphragm seal of claim 1, wherein the internal valve assembly comprises:
a valve handle; and
a valve stem coupled to the valve handle configured to selectively engage a seat within the at least one additional passageway.

3. The remote diaphragm seal of claim 1, wherein the at least one additional passageway comprises:
a first additional passageway coupled to a flushing connection, the first additional passageway configured to receive a flow of cleaning fluid from the flushing connection depending on a position of a valve within the first additional passageway.

4. The remote diaphragm seal of claim 1, wherein the at least one additional passageway comprises subchannels configured to distribute the flow of cleaning fluid along the first side of the circular deflectable diaphragm.

5. A remote diaphragm seal, comprising:
a circular deflectable diaphragm comprising a first side configured to contact a process fluid and a second side in fluidic communication with a process transmitter;
a flange sealingly welded to the circular deflectable diaphragm, the flange including:
a process fluid passageway configured to be in fluidic communication with the first side of the deflectable diaphragm and to receive the process fluid;
a fluidic passageway coupled to the second side of the circular deflectable diaphragm and the process transmitter, the fluidic passageway containing an incompressible fluid;
at least one additional passageway coupled to a flushing connection configured to receive a flow of cleaning fluid from the flushing connection and provide the flow of cleaning fluid to the first side of the circular diaphragm; and
at least one measurement passageway configured to receive, and couple to, a measurement probe to measure a variable of the process fluid, wherein the measurement probe comprises a threaded temperature measurement probe configured to determine a temperature of the process fluid.

6. The remote diaphragm seal of claim 5, and further comprising an internal valve assembly including:
a valve stem configured to selectively engage a seat within the at least one additional passageway; and
a valve handle configured to drive movement of the valve stem into and out of engagement with the seat within the at least one additional passageway.

7. The remote diaphragm seal of claim 5, wherein the at least one additional passageway comprises:
a first additional passageway coupled to the flushing connection configured to receive the flow of cleaning fluid from the flushing connection and provide the flow of cleaning fluid to the first side of the circular deflectable diagram, the first additional passageway having a longitudinal axis spaced from a center of the circular deflectable diaphragm in a first direction; and
a second additional passageway coupled to an additional flushing connection configured to receive an additional flow of cleaning fluid from the additional flushing connection and provide the additional flow of cleaning fluid to the first side of the circular diagram, the second additional passageway having a longitudinal axis spaced from a center of the circular deflectable diaphragm in a second direction opposite to the first direction.

* * * * *